US010663175B2

(12) United States Patent
Jang et al.

(10) Patent No.: US 10,663,175 B2
(45) Date of Patent: May 26, 2020

(54) HOME APPLIANCE

(71) Applicant: SAMSUNG ELECTRONICS CO., LTD., Suwon-si, Gyeonggi-do (KR)

(72) Inventors: Yong Seok Jang, Seoul (KR); Bok Hyun Jang, Hwaseong-si (KR); Yeong Hyeok Kim, Suwon-si (KR); Han Seong Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/885,080

(22) Filed: Jan. 31, 2018

(65) Prior Publication Data
US 2018/0347822 A1 Dec. 6, 2018

Related U.S. Application Data

(60) Provisional application No. 62/512,384, filed on May 30, 2017.

(30) Foreign Application Priority Data

Jul. 18, 2017 (KR) .......................... 10-2017-0090706

(51) Int. Cl.
*F24C 15/08* (2006.01)
*F25D 23/00* (2006.01)
(Continued)

(52) U.S. Cl.
CPC .......... *F24C 15/083* (2013.01); *A47L 15/427* (2013.01); *F24C 15/086* (2013.01);
(Continued)

(58) Field of Classification Search
CPC .... F16M 2200/08; F16M 7/00; D06F 39/125; A47B 91/00; A47B 91/022; A47B 91/024; A47B 91/02; F25D 2323/0011; F25D 2400/38; F25D 2323/024; F25D 23/00; A47L 15/4253; A47L 15/427; B62B 5/049; B60B 33/0089; F24C 15/083; F24C 15/086
(Continued)

(56) References Cited

U.S. PATENT DOCUMENTS 722,569 A * 3/1903 Dilger ....................... B62B 1/18
16/30
1,421,647 A * 7/1922 Wolfs ....................... B60B 33/00
16/18 R (Continued)

FOREIGN PATENT DOCUMENTS

KR 94-8033 4/1994
KR 10-2007-0040467 4/2007

*Primary Examiner* — Hiwot E Tefera
*Assistant Examiner* — Taylor L Morris
(74) *Attorney, Agent, or Firm* — Staas & Halsey LLP

(57) ABSTRACT

A home appliance having a support device configured to prevent the home appliance from falling. A home appliance includes a body having an openable front surface, and a support device having a bracket configured to be coupled to the body, and a foot configured to support the body by being coupled to the bracket, wherein the foot is provided such that a point of support supporting the body by making contact with the ground, is formed in one end portion of the foot.

14 Claims, 11 Drawing Sheets

(51) Int. Cl.
*A47L 15/42* (2006.01)
*F16M 7/00* (2006.01)
*D06F 39/12* (2006.01)

(52) U.S. Cl.
CPC .......... *F25D 23/00* (2013.01); *A47L 15/4253* (2013.01); *D06F 39/125* (2013.01); *F16M 7/00* (2013.01); *F16M 2200/08* (2013.01); *F25D 2323/0011* (2013.01); *F25D 2323/024* (2013.01); *F25D 2400/38* (2013.01)

(58) Field of Classification Search
USPC ............ 248/188.4, 188.8, 188.9, 188.2, 677; 312/351.3, 257.1, 351.1
See application file for complete search history.

(56) References Cited

U.S. PATENT DOCUMENTS

| | | | | |
|---|---|---|---|---|
| 2,175,317 | A * | 10/1939 | Rogers | B60B 33/0002 16/29 |
| 2,660,505 | A * | 11/1953 | Eck | F25D 23/006 312/236 |
| 2,680,326 | A * | 6/1954 | Sultan | A47B 91/024 248/188.4 |
| 2,793,467 | A * | 5/1957 | Matter | A47B 91/022 248/188.2 |
| 2,810,151 | A * | 10/1957 | Lapham | B60B 33/0021 16/18 A |
| 2,828,174 | A * | 3/1958 | Shapiro | F16B 12/48 248/188 |
| 2,931,128 | A * | 4/1960 | Kanzelberger | A47B 91/024 248/188.4 |
| 3,432,878 | A * | 3/1969 | Hupfer | B60B 33/00 16/32 |
| 3,535,010 | A * | 10/1970 | Eff | A47B 77/12 180/15 |
| 3,582,118 | A * | 6/1971 | Hogan | F16B 33/002 403/320 |
| 3,674,230 | A * | 7/1972 | Propst | A47B 57/42 248/188.8 |
| 3,675,269 | A * | 7/1972 | Closa | B60B 33/0052 16/18 A |
| 3,750,989 | A * | 8/1973 | Bergeson | A47L 15/4253 248/188.2 |
| 3,804,211 | A * | 4/1974 | Scherzinger | B60B 33/0089 188/5 |
| 3,814,363 | A * | 6/1974 | Brelosky | A47B 91/028 248/188.4 |
| 3,858,270 | A * | 1/1975 | Crowe | B60B 33/06 16/19 |
| 3,927,853 | A * | 12/1975 | Guth | A47B 77/02 248/188.2 |
| 3,968,949 | A * | 7/1976 | Romano, Jr. | F16M 11/10 248/650 |
| 4,020,959 | A * | 5/1977 | Livesay | B60B 33/0089 414/508 |
| 4,068,815 | A * | 1/1978 | Losert | A47B 91/16 248/188.2 |
| 4,124,187 | A * | 11/1978 | Webb | F16M 7/00 248/188.3 |
| 4,135,690 | A * | 1/1979 | Clarke | E04B 2/7422 248/188.2 |
| 4,229,917 | A * | 10/1980 | Textoris | A47B 91/00 248/188 |
| 4,327,460 | A * | 5/1982 | Wolff | B60B 33/0052 16/18 A |
| 4,368,869 | A * | 1/1983 | Gelvezon | F16M 7/00 248/188.2 |
| 4,518,142 | A * | 5/1985 | Sulcek | A47B 91/02 248/188.2 |
| 4,752,986 | A * | 6/1988 | Rivkin | B60B 33/0021 16/18 A |
| 4,763,868 | A * | 8/1988 | Teich | A47B 91/022 16/18 R |
| 4,772,035 | A * | 9/1988 | Danial | B60B 33/0002 16/30 |
| 4,789,121 | A * | 12/1988 | Gidseg | F16M 7/00 248/188.2 |
| 4,932,729 | A * | 6/1990 | Thompson | A47B 91/002 16/19 |
| 4,955,569 | A * | 9/1990 | Hottmann | F16M 7/00 248/188.2 |
| 5,058,881 | A * | 10/1991 | Measom | A63B 22/0023 248/188.2 |
| 5,215,367 | A * | 6/1993 | Montuoro | E05D 11/00 16/32 |
| 5,242,141 | A * | 9/1993 | Chester | A47B 91/00 248/188.9 |
| 5,310,156 | A * | 5/1994 | Matsumura | A47B 91/00 248/188.9 |
| 5,347,680 | A * | 9/1994 | Rippe | B60B 33/0042 16/18 R |
| 5,567,913 | A * | 10/1996 | Lin | A47B 91/00 174/58 |
| 5,749,550 | A * | 5/1998 | Jackson | A47B 91/022 248/188.2 |
| 5,878,983 | A * | 3/1999 | Olson | A47B 91/028 248/188.2 |
| 5,913,498 | A * | 6/1999 | Brown | A47B 91/024 248/188.2 |
| 5,971,350 | A * | 10/1999 | McCutcheon | A47B 91/028 248/188.2 |
| 5,971,408 | A * | 10/1999 | Mandel | B60B 33/06 248/188.4 |
| 6,070,840 | A * | 6/2000 | Kelley | A47B 9/04 248/188.2 |
| 6,119,989 | A * | 9/2000 | Hollington | A47B 13/02 248/170 |
| 6,138,979 | A * | 10/2000 | Morman | A47B 91/00 248/188.4 |
| 6,533,238 | B2 * | 3/2003 | Barnes | A47L 15/427 248/502 |
| 6,601,806 | B2 * | 8/2003 | Wing | B60B 1/006 16/19 |
| 6,669,153 | B1 * | 12/2003 | Allan | A47B 91/00 248/188.9 |
| 6,843,625 | B2 * | 1/2005 | Hewitt | B60P 7/08 280/763.1 |
| 6,923,419 | B2 * | 8/2005 | George | A47B 91/005 248/188.4 |
| 6,938,872 | B2 * | 9/2005 | Nygaard | F16M 7/00 248/188.8 |
| 7,059,693 | B2 * | 6/2006 | Park | E05B 17/0037 312/321.5 |
| 7,077,068 | B1 * | 7/2006 | Agee | A47B 9/00 108/147 |
| 7,270,242 | B2 * | 9/2007 | Liu | A47B 47/024 211/189 |
| 7,575,246 | B1 * | 8/2009 | Lunski | B62B 1/002 220/630 |
| 7,685,678 | B2 * | 3/2010 | Moon | F25D 23/028 16/243 |
| 7,845,603 | B2 * | 12/2010 | Courtney | F16M 7/00 108/51.11 |
| 7,950,501 | B2 * | 5/2011 | Takahashi | A45C 5/145 188/5 |
| 8,038,021 | B2 * | 10/2011 | Chen | A47B 46/005 211/187 |
| 8,136,201 | B2 * | 3/2012 | Yantis | A47B 91/022 16/18 R |
| 8,152,253 | B2 * | 4/2012 | Yu | A47B 97/00 312/349 |
| 8,205,843 | B2 * | 6/2012 | Phillips | A47B 91/002 248/188.1 |
| 8,220,770 | B2 * | 7/2012 | Justis | A47B 91/024 248/188.8 |
| 8,240,681 | B2 * | 8/2012 | Taguchi | B62B 5/0083 16/19 |

(56) References Cited

U.S. PATENT DOCUMENTS

| | | | |
|---|---|---|---|
| 8,491,129 B2* | 7/2013 | Koyama | G03B 21/145 248/188.2 |
| 8,511,636 B2* | 8/2013 | Kucuk | A47L 15/4253 248/188.4 |
| 8,628,059 B2* | 1/2014 | Hetrick | B60B 33/0005 16/34 |
| 8,632,038 B2* | 1/2014 | Christian | A47B 91/00 108/144.11 |
| 8,671,518 B2* | 3/2014 | Preschke | B65G 7/04 16/30 |
| 8,727,300 B2* | 5/2014 | Maier | F16M 7/00 248/300 |
| 8,777,025 B1* | 7/2014 | Buckleitner | A47F 5/04 211/13.1 |
| 8,827,389 B2* | 9/2014 | Lee | F25D 23/028 16/243 |
| 9,108,657 B2* | 8/2015 | Hussain | B62B 5/0442 |
| 2005/0116134 A1* | 6/2005 | Lee | D06F 37/20 248/650 |
| 2006/0042306 A1* | 3/2006 | Choi | F25D 23/00 62/407 |
| 2006/0168760 A1* | 8/2006 | Espindola | E05D 7/02 16/374 |
| 2007/0126325 A1* | 6/2007 | Gorz | F25D 25/025 312/404 |
| 2007/0277350 A1* | 12/2007 | Hines | B60B 33/0007 16/35 R |
| 2009/0026333 A1* | 1/2009 | Lenzini | G12B 5/00 248/188.2 |
| 2010/0213332 A1* | 8/2010 | Courtney | F16M 7/00 248/188.2 |
| 2011/0050064 A1 | 3/2011 | Phillips et al. | |
| 2011/0204762 A1* | 8/2011 | Eubanks | F25D 17/042 312/404 |
| 2011/0215691 A1 | 9/2011 | Keskin et al. | |
| 2012/0024329 A1* | 2/2012 | Ma | E04H 12/2238 135/16 |
| 2012/0181763 A1* | 7/2012 | Taylor | B65D 5/4208 280/47.33 |
| 2012/0187270 A1* | 7/2012 | Haarlander | A47B 95/00 248/544 |
| 2013/0076222 A1* | 3/2013 | Lee | F25D 23/028 312/405 |
| 2013/0112489 A1* | 5/2013 | Aschke | G01G 19/44 177/244 |
| 2013/0147336 A1* | 6/2013 | Lee | F25D 23/028 312/404 |
| 2014/0132141 A1* | 5/2014 | Sun | E05D 7/0027 312/404 |

* cited by examiner

HOME APPLIANCE

CROSS-REFERENCE TO RELATED APPLICATION(S)

This application claims the benefit of Korean Patent Application No. 10-2017-0090706, filed on Jul. 18, 2017 in the Korean Intellectual Property Office, and U.S. Provisional Application No. 62/512,384 filed on May 30, 2017, the disclosure of which is incorporated herein by reference.

BACKGROUND

1. Field

Embodiments of the present disclosure relate to a home appliance, more particularly to a home appliance having a support device configured to prevent the home appliance from falling.

2. Description of Related Art

In general, home appliances may keep their balance by having a support device in the bottom thereof. The support device may be installed in four points on the bottom of the home appliance and provided to have an adjustable height. When the home appliance is not placed in the flat surface, a user may adjust the height of the support device to keep the balance of the home appliance.

When the center of the weight of the home appliance is biased, there may be the risk of falling. When the home appliance is falling, the home appliance may be damaged by the collision with the surface. In addition, when goods such as food or tableware are placed in the home appliance, the stored goods may be damaged. Further, when a user is around the home appliance, the user may be seriously injured by the falling of the home appliance.

SUMMARY

Therefore, it is an aspect of the present disclosure to provide a home appliance having a support device configured to prevent the home appliance from falling.

It is another aspect of the present disclosure to provide a home appliance having a support device whose point of support supporting the home appliance is installed forward.

It is another aspect of the present disclosure to provide a home appliance having a support device obliquely installed at a certain angle with respect to the ground.

It is another aspect of the present disclosure to provide a home appliance having a support device configured to be not exposed to the outside of the home appliance so as to secure the appearance of the home appliance.

Additional aspects of the present disclosure will be set forth in part in the description which follows and, in part, will be obvious from the description, or may be learned by practice of the invention.

In accordance with one aspect of the present disclosure, a home appliance includes a body having a front surface, the front surface having an opening formed thereof, and a support device having a bracket configured to be coupled to the body, and a foot configured to support the body by being coupled to the bracket, wherein the foot is provided such that a point of support to support the body by making contact with a ground, is formed in one end portion of the foot.

A lower surface of the foot may be obliquely disposed at a certain angle with respect to the ground.

A lower surface of the foot except for the point of support may not be in contact with the ground.

The point of support of the foot may be placed forward than the front surface of the body is placed.

The bracket may comprise a first coupling portion coupled to one side of the front surface of the body, a second coupling portion coupled to one side of a bottom of the body, and an inclined portion obliquely extended at a certain angle from the second coupling portion.

The foot may comprise a flange portion provided in contact with the ground and a shaft portion vertically extended to an upper side from a center of the flange portion.

An insertion portion to which the shaft portion may be inserted and then coupled is provided in the inclined portion.

A thread may be formed in an inner circumferential surface of the insertion portion and in an outer circumferential surface of the shaft portion, respectively.

The flange portion may be provided in a polygonal shape equal to or greater than a quadrilateral shape.

The flange portion may be provided in a circular shape.

The width of the flange portion may be equal to or greater than about 55 mm and equal to or less than about 75 mm.

The certain angle may be equal to or greater than about 5° and equal to or less than about 15°.

The door may comprise a first door and a second door which are disposed in upward and downward directions, wherein the first door opens or closes the opening of the front surface of the body by being pivoted, and the second door opens or closes the opening of the front surface in a sliding manner.

The support device may not protrude to an outside of the door.

A position of the point of support may be maintained while the foot is being rotated.

In accordance with one aspect of the present disclosure, a home appliance includes a body having a front surface, the front surface having an opening formed thereof, a door to open or to close the opening of the front surface of the body, and a support device to support the body and to prevent the body from falling, wherein the support device is inclined at a certain angle with respect to the ground so that a partial area of the support device is in contact with the ground.

The partial area may be placed in a front end portion of the support device.

The support device may comprise a bracket having a coupling portion coupled to bottom of the body, and a foot configured to support the body by being coupled to the bracket.

The bracket may comprise an inclined portion obliquely extended at the certain angle from the coupling portion so that the foot is obliquely disposed at the certain angle with respect to the ground.

In accordance with one aspect of the present disclosure, a home appliance includes a body having a front surface, the front surface having an opening formed thereof, a door opening or closing the opening of the front surface of the body, and a support device to support the body to prevent the body from falling, wherein the support device is obliquely provided on a ground so that a contact area in contact with the ground is placed in a front end portion of the support device.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Reference will now be made in detail to embodiments of the present disclosure, examples of which are illustrated in the accompanying drawings.

The present disclosure may be applied to all kinds of home appliance having a support device supporting a body of the home appliance. For example, the home appliance may include an oven, a dishwasher, a refrigerator, and a washing machine.

Figure 1:
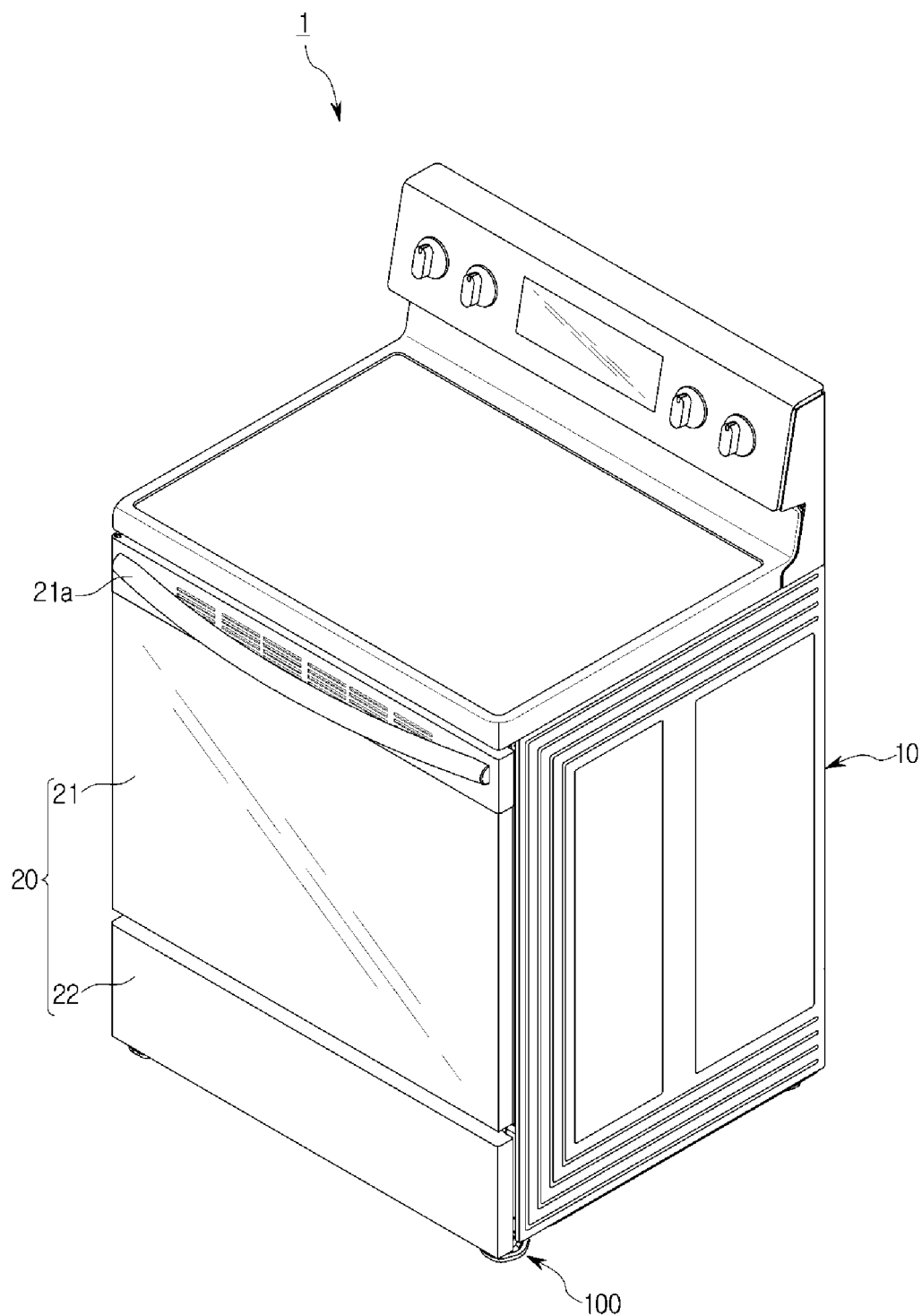
FIG. 1 is a view illustrating an oven as an example of a home appliance in accordance with an embodiment of the present disclosure.
Figure 2:
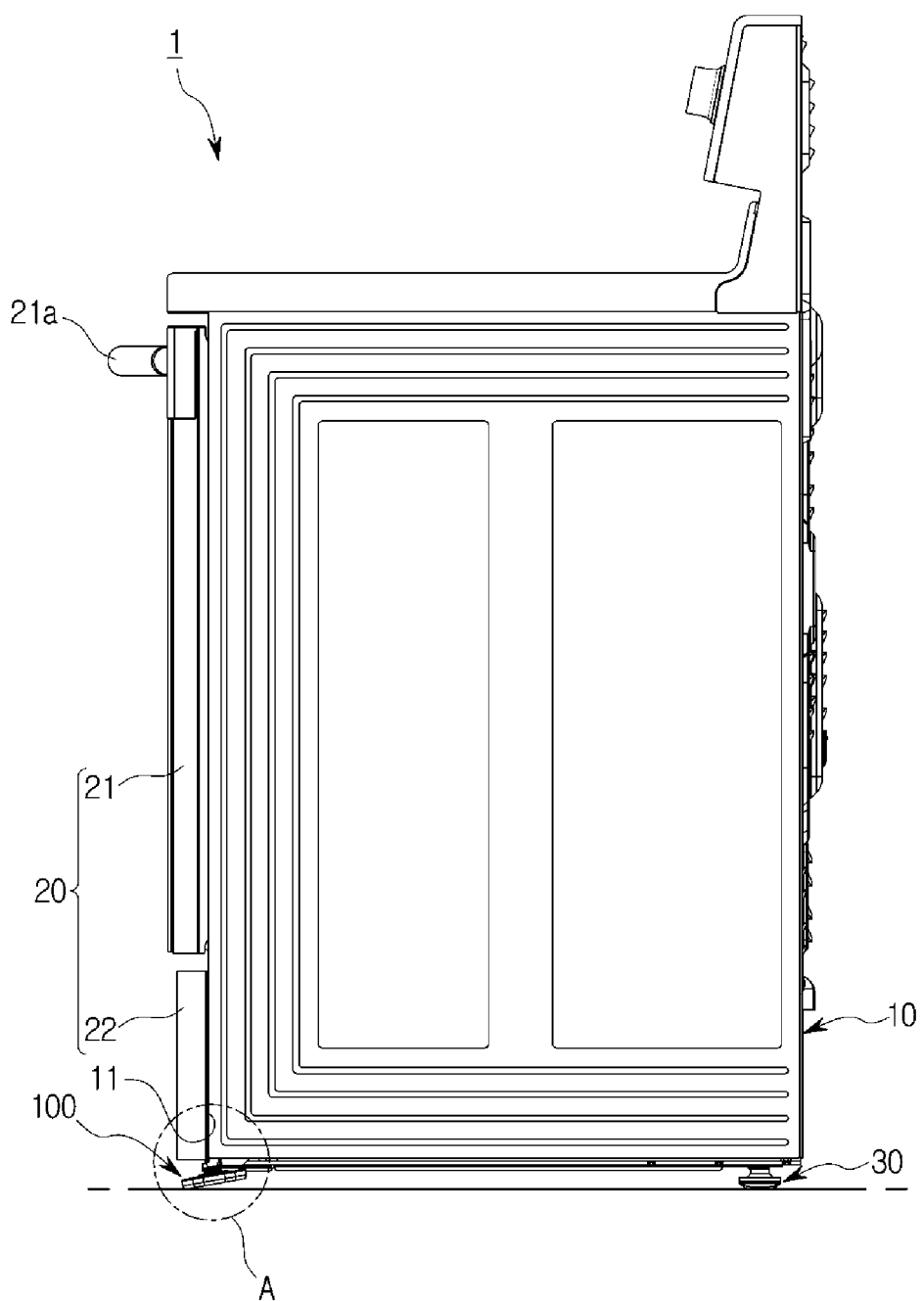
FIG. 2 is a side view of the oven.
Figure 3:
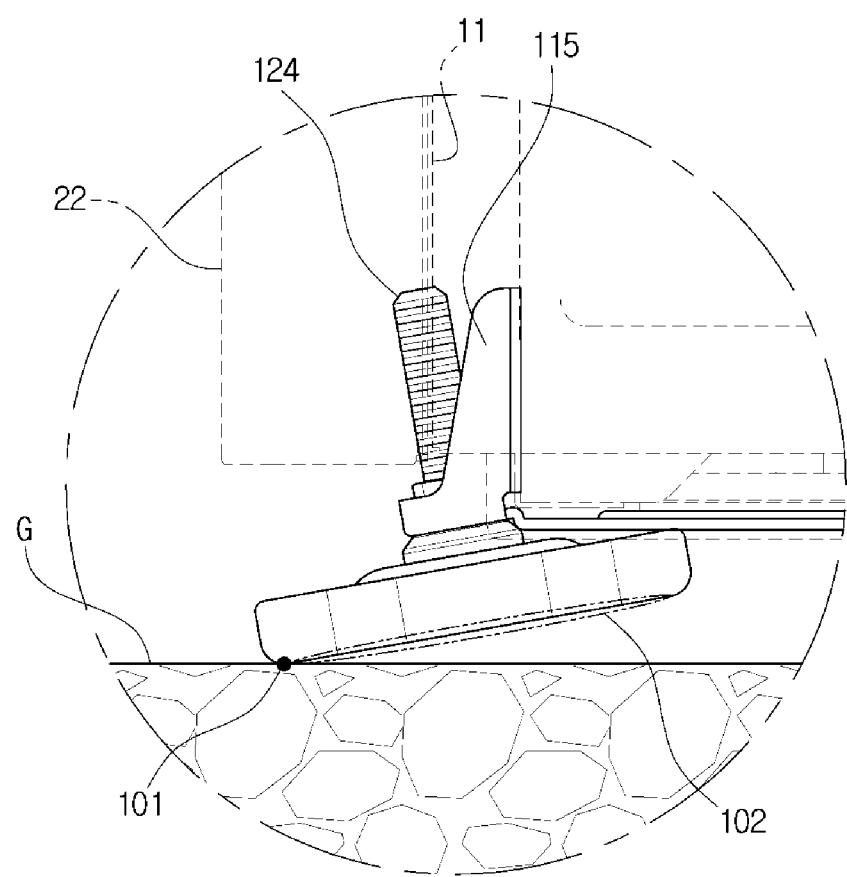
FIG. 3 is enlarged view of portion A of FIG. 2.
Figure 10:
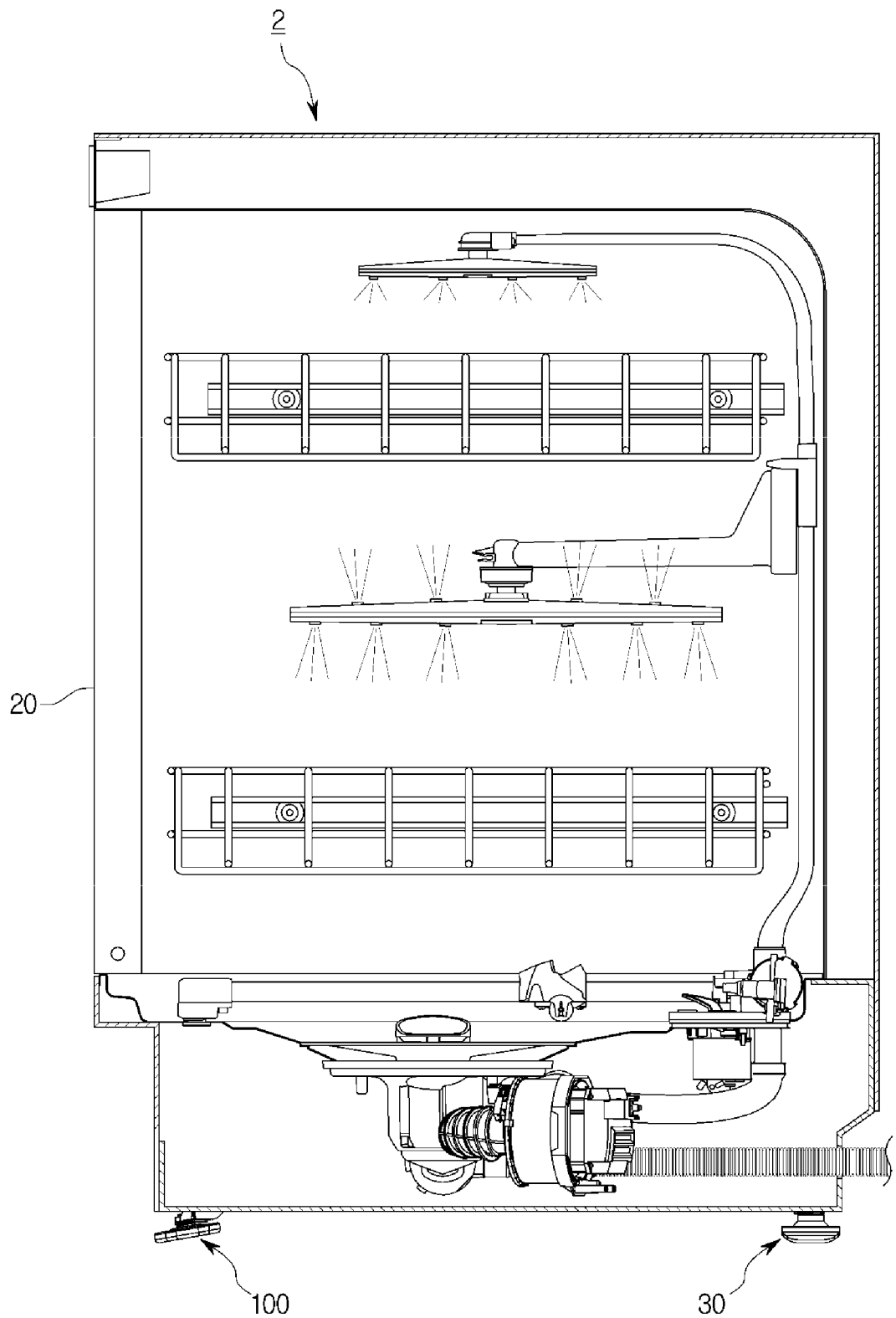
FIG. 10 illustrates a dishwasher as example of the home appliance.
Figure 11:
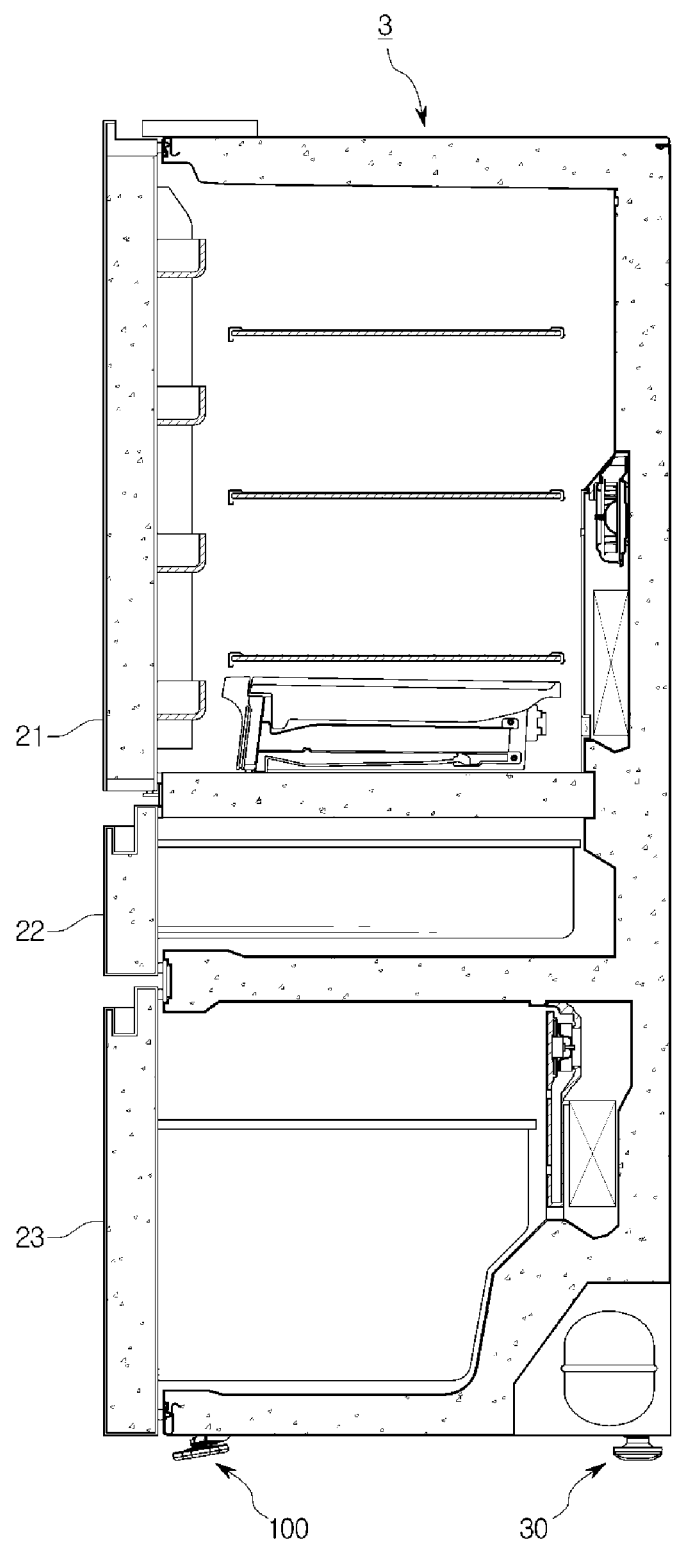
FIG. 11 illustrates a refrigerator as example of the home appliance.

FIGS. 1 to 3 illustrate an oven as example of the home appliance. FIG. 10 illustrates a dishwasher as example of the home appliance, but FIG. 11 illustrates a refrigerator as example of the home appliance. Although not shown in the drawings, the home appliance may include a variety of home appliance as well as a washing machine.

FIG. 1 is a view illustrating an oven as an example of a home appliance in accordance with an embodiment of the present disclosure. FIG. 2 is a side view of the oven, and FIG. 3 is enlarged view of portion A of FIG. 2.

As illustrated in FIGS. 1 and 2, according to an embodiment, an oven 1 may include a body 10 and a door 20.

A front surface of the body 10 may be openable. In the body 10, a cooking compartment (not shown) may be provided. The door 20 may be configured to open and close the opened front surface of the body 10. The door 20 may open and close the cooking compartment.

The door 20 may include a first door 21 and a second door 22 which are disposed in the upper and lower side, respectively. The cooking compartment may include a first the cooking compartment (not shown) opened or closed by the first door 21 and a second cooking compartment (not shown) opened or closed by the second door 22.

The first door 21 disposed in the upper side may be pivoted to the lower side so as to open the first cooking compartment. The first door 21 may include a handle 21a.

The second door 22 may be moved in sliding manner to open the second cooking compartment. However, it is merely an example, and thus the door may be opened or closed in a variety of manners and there is no limitation in the number of the door.

As illustrated in FIG. 2, a first support device 100 and a second support device 30 may be provided in the lower end portion of the oven 1.

The first support device 100 may be obliquely provided at a certain angle with respect to the ground (G), and the second support device 30 may be provided in parallel with the ground (G). For example, the first support device 100 may be provided so that a bottom surface of the first support device 100 is not parallel to the ground (G).

The second support device 30 may be provided such that a point of support thereof supporting the body 10 is formed in the center of the second support device 30.

Meanwhile, the first support device 100 may be provided such that a point of support thereof is formed in one end portion of the first support device 100. For example, a point of support of the first support device 100 may be provided at a front end portion of the first support device 100. Accordingly, the point of support of the first support device 100 may be disposed under a front surface 11 of the body 10 or disposed further forward than the front surface 11. When the point of support of the first support device 100 is disposed forward, the risk of falling of the first support device 100 to the front side may be reduced even when the center of gravity of the oven 1 is moved to the front side.

In general, in a case in which heavy food or heavy tableware is placed on the first door 21 or the second door 22 of the oven 1, which is opened, the center of gravity of the oven 1 may be moved to the front side of the body 10 due to the weight of the door 20 and the goods placed in the door 20. When the center of gravity of the oven 1 is moved to the front side of the body 10, the risk of falling of the body 10 may be changed according to the position of the point of support of the first support device 100. As the point of support of the first support device 100 is forward, the risk of falling of the body 10 to the front side may be reduced, but as the point of support of the first support device 100 is backward, the risk of falling of the body 10 to the front side may be increased. A detail description thereof will be later.

To prevent the falling of the body 10, the point of support of the first support device 100 is needed to be placed in the front side of the body 10. Hereinafter a structure of the first support device 100, which is to allow the point of support of the first support device 100 to be placed forward, will be described in detail. Hereinafter "support device" may represent the first support device. With respect to FIG. 2, "front side" may indicate the left side.

Figure 4:
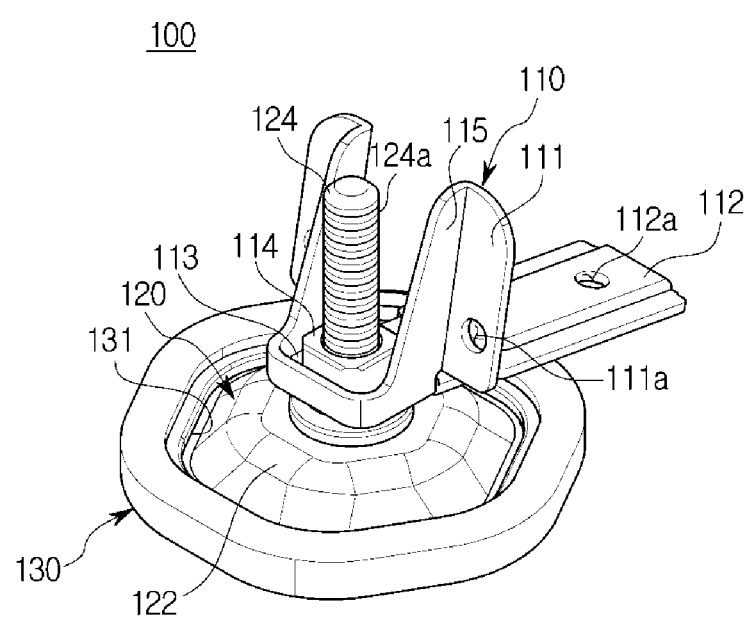
FIG. 4 is a view illustrating a support device 100 in accordance with an embodiment of the present disclosure.
Figure 5:
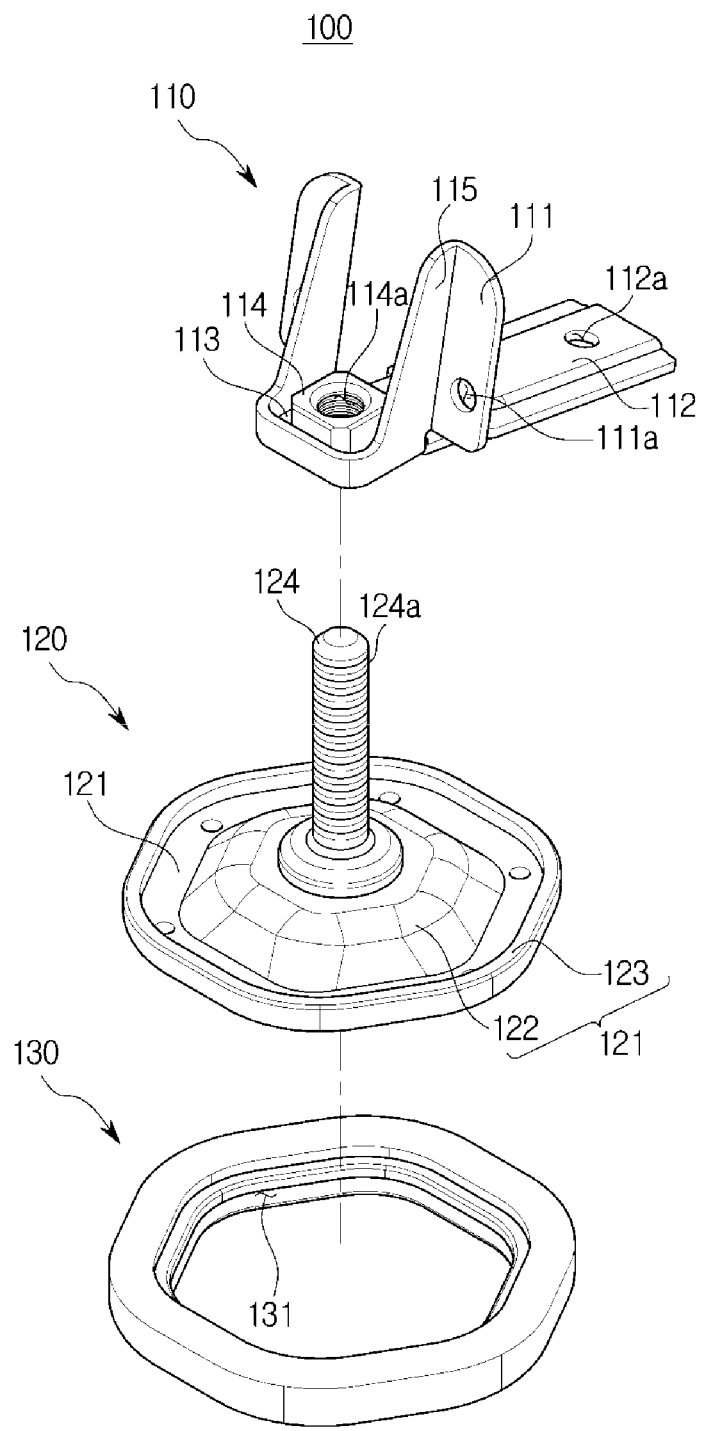
FIG. 5 is an exploded view illustrating the support device 100 of FIG. 4.

FIG. 4 is a view illustrating a support device 100 in accordance with an embodiment of the present disclosure, and FIG. 5 is an exploded view illustrating the support device 100 of FIG. 4.

As illustrated in FIGS. 4 to 5, the support device 100 may include a bracket 110, a foot 120 and a cover 130.

The bracket 110 may be coupled to the body 10. The bracket 110 may include a first coupling portion 111 coupled to one side of the front surface of the body 10 and a second coupling portion 112 coupled to one side of the lower surface of the body 10. The first coupling portion 111 and the second coupling portion 112 may include a coupling hole 111a and 112a, respectively. As a coupling member (not shown) is inserted in to the coupling hole 111a and 112a, the bracket 110 may be coupled to the body 10.

The bracket 110 may include an inclined portion 113 obliquely extended from the second coupling portion 112 at a certain angle. An insertion portion 114 to which the foot 120 is inserted and coupled may be provided in the inclined portion 113. At an inner circumferential surface of the insertion portion 114, a thread 114a may be formed.

The bracket 110 may include a connecting portion 115 connecting the first coupling portion 111, the second coupling portion 112 and the inclined portion 113. The connecting portion 115 may have a shape having the width thereof being increased as the connecting portion 115 becomes near to the lower side thereof. Therefore, the strength of the bracket 110 may be reinforced.

The foot 120 may include a flange portion 121 configured to be in contact with the ground (G) and a shaft portion 124 provided in the center of the flange portion 121.

The flange portion 121 may include a rib 123 provided on an edge portion and a reinforcing portion 122 having the thickness thereof being thickened as becoming near to the center of the flange portion 121.

The flange portion 121 may be provided in a hexagonal shape, but is not limited thereto. The flange portion 121 may be provided in a polygonal shape equal to or greater than a quadrilateral shape or in a circular shape as will be described later.

When the flange portion 121 is provided in a polygonal shape, it is easy to rotate the foot 120 since a user's hand does not slip when rotating the foot 120. Therefore, it is easy to adjust the height of the foot 120.

The shaft portion 124 may extend vertically toward the upper side from the center of the flange portion 121. A thread 124a may be formed in an outer circumferential surface of the shaft portion 124. As described above, since the thread 114a is formed in the inner circumferential surface of the insertion portion 114, the shaft portion 124 and the insertion portion 114 may be screw-coupled to each other.

The cover 130 may be fitted on the outside of the foot 120. Particularly, the cover 130 may be coupled to the foot 120 such that the rib 123 of the foot 120 is inserted into an insertion groove 131 provided inside of the cover 130.

The cover 130 may include a rubber or an injection material having the high elastic modulus. The cover 130 may include a material having the high friction coefficient. The cover 130 may increase the frictional force against the ground (G). The cover 130 may absorb an impact applied to the foot 120 from the ground (G).

Referring to FIG. 3, the foot 120 may be disposed at a certain angle with respect to the ground (G). Accordingly, the point of support 101 of the foot 120 may be disposed in the front end portion of the foot 120. As illustrated in FIG. 3, the point of support 101 may be disposed further forward than the front surface 11 of the body 10. Alternatively, the point of support 101 may be located under the front surface 11 of the body 10.

The foot 120 may be provided such that a partial area thereof is in contact with the ground (G) and a remaining area except for the partial area is not in contact with the ground (G). As for the foot 120, a remaining area except for the point of support 101 may be not in contact with the ground (G). The foot 120 may be disposed at a certain angle with respect to the ground (G) so that only the point of support 101 is in contact with the ground (G).

As illustrated in FIGS. 2 and 3, the foot 120 may be disposed not to protrude to the outside of the door 20. When the foot 120 is protruded outside of the door 20, the foot 120 may be exposed to the outside of the home appliance and it may cause of the reduction of the appearance quality. In addition, the user may be injured when the user's foot is hit with the foot 120.

As described above, the foot 120 is disposed not to protrude to the outside of the oven 1 so that there is no fear of harm to the appearance of the oven 1.

Figure 6:
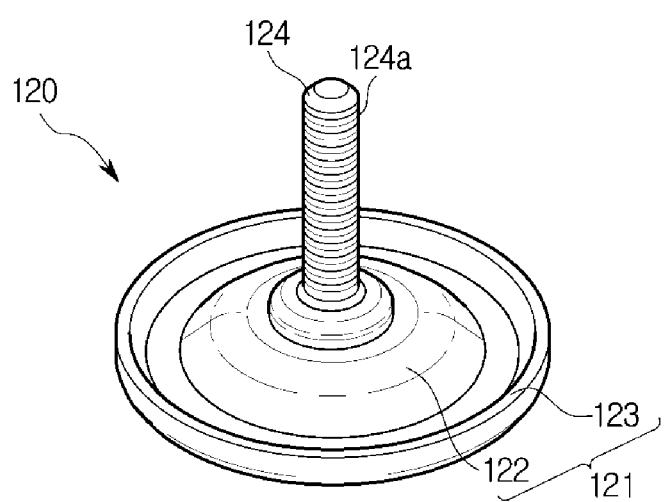
FIG. 6 is a view illustrating a foot 120 according to another embodiment of the present disclosure.

FIG. 6 is a view illustrating a foot 120 according to another embodiment of the present disclosure.

As illustrated in FIG. 6, a flange portion 121 of a foot 120 may be provided in the circular shape not the polygon shape. When the flange portion 121 is provided in the circular shape, the position of the point of support 101 (refer to FIG. 3) may be not changed although the foot 120 rotates.

Figure 7:
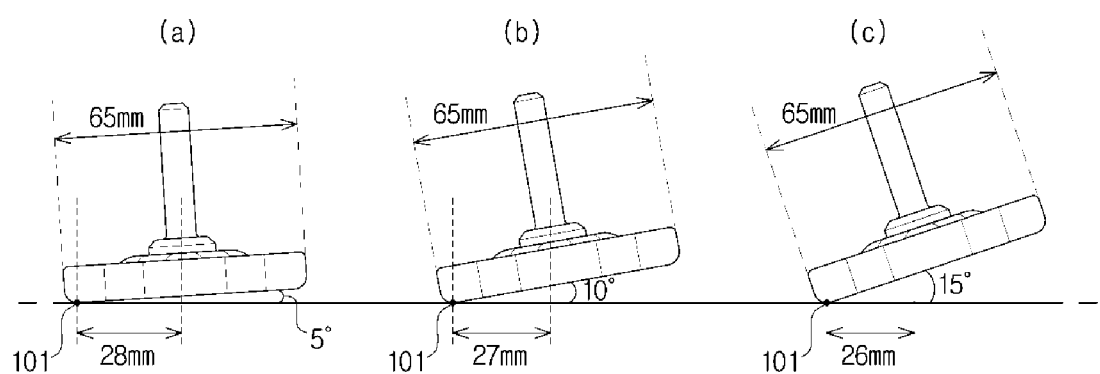
FIG. 7 is a view illustrating a foot inclined at a different angle in the home appliance in accordance with an embodiment of the present disclosure.

FIG. 7 is a view illustrating a foot inclined at a different angle in the home appliance in accordance with an embodiment of the present disclosure. Hereinafter the width of the foot 120 may represent a diameter when the foot 120 is provided in the circular shape, and the width of the foot 120 may represent a height when the foot 120 is provided in the polygon shape.

Referring to FIG. 7, the position of the point of support 101 may vary according to the slope of the 120. FIG. 7 illustrates a case in which the width of the foot 12 is 65 mm.

As illustrated in FIG. 7, when the foot 120 is inclined at five degree (5°) with respect to the ground (G), the point of support 101 may be disposed 28 mm ahead from the center of the foot 120. When the foot 120 is inclined at ten degree (10°) with respect to the ground (G), the point of support 101 may be disposed 27 mm ahead from the center of the foot 120. When the foot 120 is inclined at fifteen degree (15°) with respect to the ground (G), the point of support 101 may be disposed 26 mm ahead from the center of the foot 120. That is, as an inclination angle between the foot 120 and the ground (G) is increased, a distance between the point of support 101 and the center of the foot 120 may be reduced.

When the slope of the foot 120 is equal to or less than five degree (5°), the distance between the center of the foot 120 and the point of support 101 may be increased and thus the point of support 101 may be disposed forward. However, a force applied to the foot 120 may be increased and thus there may be the risk of the deformation of the foot 120.

When the slope of the foot 120 is equal to or more than fifteen degree (15°), the distance between the center of the foot 120 and the point of support 101 may be reduced and thus the effect of disposing the point of support 101 forward (hereinafter referred to as "the effect of forward placement of the point of support 101) may be reduced.

Accordingly, according to an embodiment, it may be appropriate that the slope of the foot 120 is arranged in a range of from five degree (5°) to fifteen degree) (15°).

Figure 8:
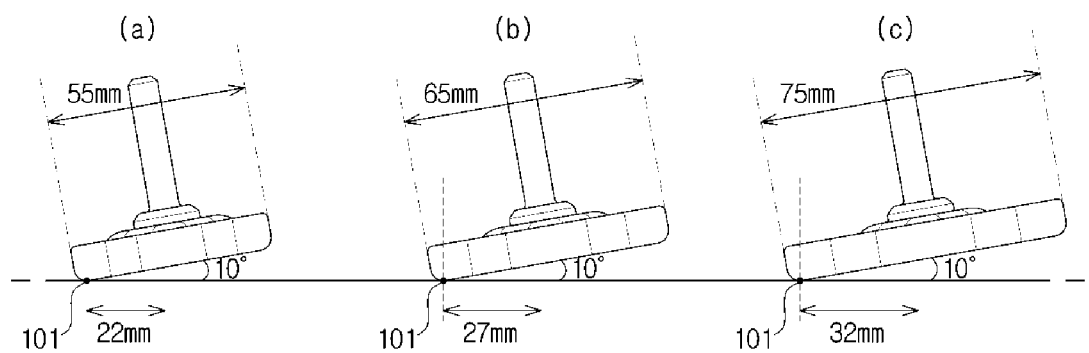
FIG. 8 is a view illustrating a foot having a different width in the home appliance in accordance with an embodiment of the present disclosure.

FIG. 8 is a view illustrating a foot having a different width in the home appliance in accordance with an embodiment of the present disclosure.

Referring to FIG. 8, the position of the point of support 101 may vary according to the width of the foot 120. FIG. 8 illustrates a case in which the inclination angle of the foot 120 is ten degree (10°).

As illustrated in FIG. 8, when the width of the foot 120 is 55 mm, the distance between the center of the foot 120 and the point of support 101 may be 22 mm and when the width of the foot 120 is 65 mm, the distance between the center of the foot 120 and the point of support 101 may be 27 mm. When the width of the foot 120 is 75 mm, the distance between the center of the foot 120 and the point of support 101 may be 32 mm.

When the width of the foot 120 is 55 mm, the effect of forward placement of the point of support 101 may be reduced.

When the width of the foot 120 is 75 mm, the distance between the center of the foot 120 and the point of support 101 may become longer and thus the force applied to the foot 120 may be increased. Accordingly, the foot 120 may be torsional and deformed. In addition, the foot 120 may be exposed to the outside of the home appliance. Therefore, it can harm the appearance and the marketability of home appliance.

Therefore, according to an embodiment, it may be appropriate that the width of the foot 120 is provided in a range from 55 mm or more to 75 mm or less.

Figure 9:
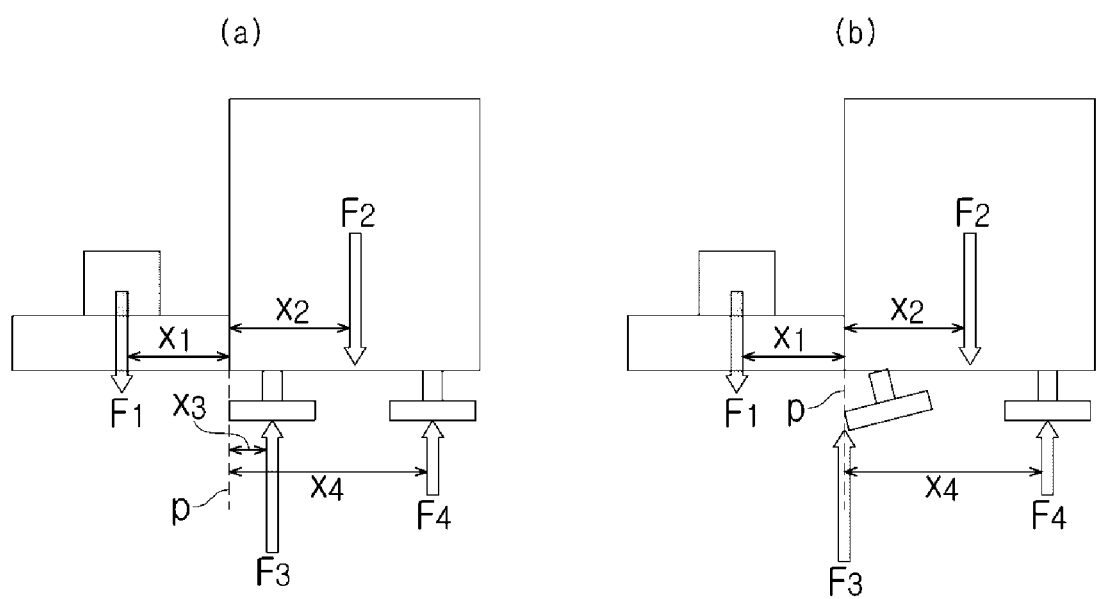
FIG. 9 is a view illustrating a difference between a foot obliquely installed and a foot in a conventional manner, in the home appliances in accordance with an embodiment.

FIG. 9 is a view illustrating a difference between a foot obliquely installed and a foot in a conventional manner, in the home appliances in accordance with an embodiment.

Referring to FIG. 9, the fall prevention effect of the home appliance by the support device 100 according to an embodiment will be described with reference to formulas.

In general, before the door is opened, the center of gravity of the home appliance is displaced inside of the body and thus it is less likely to fall.

However, in a state in which the door is opened, when a heavy good is placed on the opened door, the center of gravity of the home appliance may be moved forward. Accordingly, the center of gravity of the home appliance may be placed outside of the home appliance, and thus the risk of falling may be increased.

As illustrated in FIG. 9, a point of falling of the home appliance (p) is placed in the front surface of the body of the home appliance. Hereinafter the fall prevention effect of the home appliance when the point of support is disposed forward will be described with reference to the formula by calculating the sum of moment in the point of falling (p).

Referring to FIG. 9A, when the point of support is not disposed forward, the sum of moment in the point of falling (p), is as follows.

$$\Sigma M = F1^* \times 1 - F2^* \times 2 + F3^* \times 3 + F4^* \times 4$$

Referring to FIG. 9B, when the point of support is disposed forward, the sum of moment in the point of falling (p), is as follows.

$$\Sigma M = F1^* \times 1 - F2^* \times 2 + F4^* \times 4$$

When the point of support is disposed forward, in other words, when the foot is obliquely installed, the sum of the moment is less than the sum of the moment when the point of support is not disposed forward, by F3*×3. Therefore, there is less risk of falling in FIG. 9B in which the sum of the moment in the point of falling (p) is small. According to an embodiment of the present disclosure, it may be possible to move the point of support of the support device forward, thereby reducing the risk of falling of the home appliance.

As is apparent from the above description, it may be possible to provide the home appliance provided with the support device capable of preventing the home appliance from falling.

It may be possible to provide the home appliance provided with the support device in which the point of support supporting the home appliance is placed forward.

It may be possible to provide the home appliance provided with the support device obliquely disposed at a certain angle with respect to the ground.

It may be possible to provide the home appliance provided with the support device capable of not being exposed to the outside of the home appliance thereby not affecting the appearance of the home appliance.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A home appliance comprising:
a body having a front side, a rear side, a bottom side and sides to form the body, the front side having an opening formed thereof;
a door to open or close the opening;
a bracket coupled to the body, the bracket comprising
a first coupling portion coupled to the front side of the body,
a second coupling portion coupled to the bottom side of the body, and
an inclined portion integrally formed and extended from the second coupling portion, the inclined portion inclined by an angle with respect to the second coupling portion and comprising an insertion portion thereof; and
a foot comprising a flange portion configured to be in contact with a ground and a shaft portion extended from a center of the flange portion so that the foot is coupled to the inclined portion by inserting the shaft portion into the insertion portion to support the body to prevent the body from falling forward,
wherein the inclined portion and the shaft portion are perpendicular to each other,
wherein when one end portion of the flange portion makes contact with the ground to support a weight of the body, an other end portion of the flange portion does not make contact with the ground based on the angle of the inclined portion, and
wherein the one end portion does not protrude forward of the door.

2. The home appliance of claim 1, wherein
a lower surface of the foot includes the one end portion and the other end portion, the lower surface of the foot is obliquely disposed at the angle with respect to the ground.

3. The home appliance of claim 1, wherein
a lower surface of the foot includes the one end portion and the other end portion, the lower surface of the foot, except for the one end portion, is not in contact with the ground.

4. The home appliance of claim 1, wherein
the one end portion of the foot includes a point of support of the foot that is placed forward with respect to the front side of the body.

5. The home appliance of claim 1, wherein
the insertion portion comprises a thread formed in an inner circumferential surface thereof and the shaft portion comprises a corresponding thread to the thread of the insertion portion in an outer circumferential surface thereof so that the shaft portion is coupled to the insertion portion.

6. The home appliance of claim 1, wherein the flange portion is formed in a polygonal shape equal to or greater than a quadrilateral shape.

7. The home appliance of claim 1, wherein the flange portion is formed in a circular shape.

8. The home appliance of claim 1, wherein a width of the flange portion is in a range from about 55 mm to about 75 mm.

9. The home appliance of claim 1, wherein the angle is in a range from about 5° to about 150°.

10. The home appliance of claim 1,
wherein the door comprises a first door and a second door,
wherein the opening includes a first opening which is opened or closed by the first door and a second opening which is opened or closed by the second door.

11. The home appliance of claim 1, wherein
the one end portion of the foot includes a point of support and a position of the point of support is maintained while the foot is being rotated.

12. The home appliance of claim 1, wherein the flange portion further comprises a rib formed on an edge portion thereof.

13. The home appliance of claim 12, further comprising a foot cover having an insertion groove therein so that the rib is inserted into the insertion groove to cover the foot.

14. The home appliance of claim 1, wherein the flange portion further comprises a reinforcing portion formed in a center portion the flange portion and the reinforcing portion has a higher an increased thickness toward the center portion of the flange portion.

* * * * *

UNITED STATES PATENT AND TRADEMARK OFFICE
CERTIFICATE OF CORRECTION

PATENT NO. : 10,663,175 B2  
APPLICATION NO. : 15/885080  
DATED : May 26, 2020  
INVENTOR(S) : Yong Seok Jang Page 1 of 1

It is certified that error appears in the above-identified patent and that said Letters Patent is hereby corrected as shown below:

In the Claims

Column 8, Line 66 (approx.), In Claim 9, delete "150°." and insert -- 15°. --, therefor.

Column 9, Line 19, In Claim 14, after "has" delete "a higher".

Signed and Sealed this  
Twenty-second Day of September, 2020

Andrei Iancu  
*Director of the United States Patent and Trademark Office*